United States Patent
Abraham et al.

[11] Patent Number: 5,810,477
[45] Date of Patent: Sep. 22, 1998

[54] SYSTEM FOR IDENTIFYING SURFACE CONDITIONS OF A MOVING MEDIUM

[75] Inventors: David William Abraham, Ossining; Timothy Joseph Chainer, Mahopac, both of N.Y.

[73] Assignee: International Business Machines Corporation, Armonk, N.Y.

[21] Appl. No.: 643,193

[22] Filed: May 6, 1996

Related U.S. Application Data

[63] Continuation-in-part of Ser. No. 56,164, Apr. 30, 1993, Pat. No. 5,527,110.

[51] Int. Cl.⁶ .......................... G01N 25/72; G01N 25/00
[52] U.S. Cl. .................... 374/7; 374/4; 374/153; 374/141; 374/142
[58] Field of Search ........................ 374/4, 5, 6, 7, 374/141, 153, 142

[56] References Cited

U.S. PATENT DOCUMENTS

| | | | |
|---|---|---|---|
| 3,416,373 | 12/1968 | Havens | 374/6 |
| 3,808,439 | 4/1974 | Renius | 374/4 |
| 4,430,010 | 2/1984 | Zrenner et al. | 374/45 |
| 4,468,136 | 8/1984 | Murphy et al. | 374/124 |
| 4,513,384 | 4/1985 | Rosencwaig | 374/7 |
| 4,522,510 | 6/1985 | Rosencwaig et al. | 374/7 |
| 4,532,802 | 8/1985 | Yeack-Scranton et al. | 73/866.4 |
| 4,671,674 | 6/1987 | Detronde | 374/5 |
| 4,679,946 | 7/1987 | Rosencwaig et al. | 374/7 |
| 4,747,698 | 5/1988 | Wickramasinghe et al. | 374/6 |
| 4,762,427 | 8/1988 | Hori et al. | 374/141 |
| 4,777,544 | 10/1988 | Brown et al. | 360/75 |
| 4,853,810 | 8/1989 | Pohl et al. | 360/103 |
| 4,854,730 | 8/1989 | Fraden | 374/164 |
| 4,886,370 | 12/1989 | Koshihara et al. | 374/5 |
| 4,914,398 | 4/1990 | Jove et al. | 328/167 |
| 4,931,887 | 6/1990 | Hegde et al. | 360/75 |
| 5,031,456 | 7/1991 | Askwith et al. | 374/5 |
| 5,054,936 | 10/1991 | Fraden | 374/164 |
| 5,130,866 | 7/1992 | Klaassen et al. | 360/75 |
| 5,527,110 | 6/1996 | Abraham et al. | 374/7 |

FOREIGN PATENT DOCUMENTS

| | | | |
|---|---|---|---|
| 0304708 | 3/1989 | European Pat. Off. | 374/4 |
| 0333100 | 9/1989 | European Pat. Off. | 374/5 |
| 0139462 | 1/1980 | German Dem. Rep. | 374/4 |
| 0565239 | 7/1977 | U.S.S.R. | 374/5 |

OTHER PUBLICATIONS

"Disk Asperity Detector" IBM Technical Disclosure Bulletin, vol. 26, No. 3A, Aug. 1983.

*Primary Examiner*—Diego F. F. Gutierrez
*Attorney, Agent, or Firm*—Heslin & Rothenberg, P.C.

[57] ABSTRACT

A method and apparatus for mapping the character and location of medium conditions for a planar surface. Energy is supplied to a head in close proximity to the planar surface to thereby raise the temperature of the object. The head is moved with respect to the planar surface while keeping the distance from the planar surface substantially constant. An increase, decrease or a rapid variation containing positive and negative temperature excursions is distinguished by electronic means. These variations are used to categorize disturbances or contact with the medium, and the location and type of condition is recorded in hard copy or by computer acquisition for later consideration in the file manufacture process. Additionally, magnetic and thermal information may be combined to provide an even more complete description of the nature of the condition, since the magnetic and thermal signals are descriptive of different physical phenomenon.

36 Claims, 7 Drawing Sheets

SYSTEM FOR IDENTIFYING SURFACE CONDITIONS OF A MOVING MEDIUM

CROSS-REFERENCE TO RELATED APPLICATIONS

This application is a Continuation-In-Part of U.S. patent application:
METHOD AND APPARATUS FOR DETECTING ASPERITIES ON MAGNETIC DISKS USING THERMAL PROXIMITY IMAGING filed Apr. 30, 1993, Ser. No. 08/056,164, now U.S. Pat. No. 5,527,110.

This application is incorporated by reference herein in its entirety.

TECHNICAL FIELD

This invention relates generally to a method and an apparatus for the categorization of medium conditions on a surface, by detecting the presence and nature of these conditions using thermal conduction. More specifically, the invention relates to a method and apparatus for analyzing and categorizing medium conditions on the surface of a rotating disk in a direct access storage device, such as a magnetic disk drive.

BACKGROUND OF THE INVENTION

In data processing systems, magnetic disk drives are often used as direct access storage devices. In such devices, read-write heads are used to write data on, or read data from, an adjacently rotating hard or flexible disk. To prevent damage to either the disk or the read-write head, it has been recognized for a long time that the surface of the disk should be very flat and free of any bumps or the like which might be contacted by the read-write head. Also, the read-write heads have been designed so that they will fly over the surface of the rotating disk at a very small, though theoretically constant, distance above the disk, the separation between the read-write head and the disk being maintained by a film of air. During its flight, the head undergoes continuous vibration, pitch and roll as the topography of the disk changes beneath the head. If the quality of the disk or the read-write head is poor, occasional rubbing or sharp contact may occur between the disk and the read-write head, leading to damage to the head or to the disk, and possibly the loss of valuable data.

Various attempts have been made to provide increased assurance that such undesirable contact between a read-write head and a recording disk does not occur. Rigid manufacturing and quality assurance specifications for both the recording disk and the read-write head have been instituted.

Disk inspection for various types of defects, including magnetic, optical and topographic (i.e., delamination, voids and inclusions, generally known as asperities), is of critical importance for the increasingly stringent production requirements facing a manufacturer today as smaller drives store more data. Many methods of inspection to find defects are in use, and many more have been proposed. These include optical techniques (fiber interferometry, bulk optic shear interferometry, microISA), magnetic readout (simply screening, HRF, etc.,) and mechanical testing (the so-called PZT glide test, described below). Each of these techniques may play a role in achieving the goal of the virtually defect free production of magnetic disks. However, with a tightening market and more exacting technical requirements as heads fly lower and faster, less expensive and more accurate inspection schemes become desirable.

The PZT glide test is disclosed in U.S. Pat. No. 4,532,802 to Yeack-Scranton et al. A read-write head is provided with a plurality of piezo-electric transducers which produce signals related to its movement as it flies over an adjacently rotating recording disk. By filtering these signals to determine their spectral components in low, medium and high ranges, hard contacts between the head and disk, disk wear or roughness, and head movement can be determined. While quite satisfactory in many aspects, this technique depends on contact between the read-write head and the disk, and as a result the heads wear out and costly replacement is required. In addition, resolution in the radial direction is limited by the geometry of the head to about 2 mm in the radial direction.

U.S. Pat. No. 4,747,698 to Wickramasinghe et al. is directed to a Scanning Thermal Profiler. A fine scanning tip is heated to a steady state temperature at a location remote from the structure to be investigated. Thereupon, the scanning tip is moved to a position proximate to, but spaced from the structure. At the proximate position, the temperature variation from the steady state temperature is detected. The scanning tip is scanned across the surface structure with the aforesaid temperature variation maintained constant. Piezo electric drivers move the scanning tip both transversely of, and parallel to, the surface structure. Feedback control assures the proper transverse positioning of the scanning tip and voltages thereby generated replicate the surface structure to be investigated. While this approach provides excellent depth resolution, it requires the use of an expensive scanning tip. It also has, in common with the approach illustrated in U.S. Pat. No. 4,532,802 discussed above, the disadvantage that it cannot readily be utilized on an assembled disk drive.

What is needed is a method and apparatus for the detection of surface conditions on an otherwise smooth surface. The method and apparatus should provide for the subsequent categorization of the conditions into one of a plurality of possible types. Further, the method and apparatus should be useable in assembled disk drives, and provide the requisite function at a lower cost than the prior art systems.

SUMMARY OF THE INVENTION

The present invention, in one aspect, is a method for identifying surface disturbances on a medium moving relative to a head, including monitoring a thermal environment over the moving medium with the head and processing the monitored thermal environment. By processing the monitored thermal environment, a type of a surface disturbance encountered on the moving medium is identified. Further, an interaction between the head and the medium is identified using the monitored thermal environment. The monitoring may include providing a signal indicative of the thermal environment, and the type of surface disturbances is identified by determining whether the signal falls below a first level or whether the signal rises above a second level. The interaction is identified by determining whether, within a predetermined time period, the signal oscillates between the first and second levels.

The first type of surface disturbance may be a protrusion type disturbance, which causes a temperature of the monitored thermal environment to decrease, and the second type of surface disturbance may be a recess type disturbance, which causes the temperature of the monitored thermal environment to increase.

In another aspect, the method includes monitoring a magnetic environment on the moving medium, and processing the monitored magnetic environment. By processing the monitored magnetic environment, a magnetic defect encountered on the moving medium can be detected. Thus, the present invention combines disturbance detection and identification using both the magnetic and thermal environments of the moving medium.

In another aspect, the present invention is a system for identifying surface conditions of a medium moving relative to a head. The system includes an input node for receiving an input signal representative of a thermal environment over the medium, a first processing path coupled to the input node for determining whether the input signal received therefrom meets a first criteria (e.g., recess), and a second processing path coupled to the input node for determining whether the input signal received therefrom meets a second criteria (e.g., protrusion). The system may include a circuit for determining whether the input signal meets a third criteria, the third criteria corresponding to an oscillating signal indicative of an interaction between the head and the medium. The system includes a comparator, pulse generator, reference signal, and AND gate for the first and second processing paths, in one embodiment.

The system may further include another input for receiving another input signal representative of a magnetic environment on the medium. A magnetic environment processing path may be provided for processing the magnetic input signal and detecting magnetic defects therefrom.

The method and system of the present invention overcome the shortcomings of the prior art in that medium conditions can be sensed and categorized into a plurality of types. Further, the addition of magnetic defect sensing allows categorization and qualification of the defect types, and causes thereof.

DETAILED DESCRIPTION OF THE PREFERRED EMBODIMENT(S)

Figure 1:
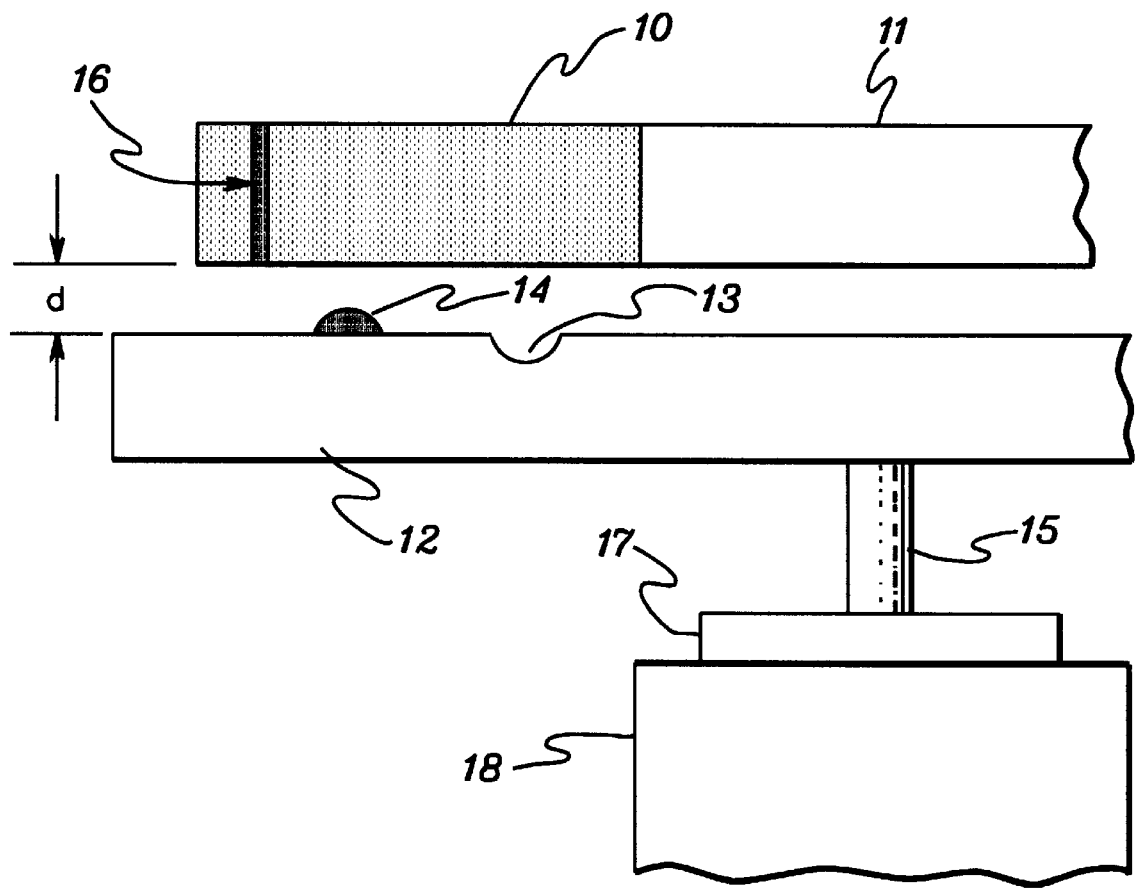
FIG. 1 is an enlarged view of a read-write head flying over a rotating disk having disturbances thereon.

Referring to FIG. 1, a head (10, 16) mounted on an actuator 11, used to detect medium conditions is depicted. These conditions may include surface disturbances (e.g., protrusions or recesses, which are general terms used herein to refer to disturbances sometimes known as asperities, pits, bumps, defects, particles, etc.) and/or magnetic disturbances and/or contact with the head. The geometry of the slider 10 with relation to the disk 12 and a recess 13 and a protrusion 14 is shown.

As is well known in the art, disk 12 rotates on a spindle 15, driven by a motor 18. (Any type of relative motion between the head and the medium is referred to herein as the medium moving relative to the head. This naturally includes a moving medium and fixed heads, spinning disks, moving tapes, or can be a moving head and fixed medium, or any combination thereof.) An encoder 17 provides data on the relative rotational orientation of disk 12 with respect to slider 10. (The term "head" when used herein, broadly connotes any device used in association with a medium, including, but not limited to, the slider, MR element or stripe, or any thermal or magnetic sensing device, or any combination thereof, such as that depicted in FIG. 1.)

Slider 10 has an air bearing surface facing disk 12. The relative motion of the air bearing surface of slider 10 and the planar surface of disk 12 maintains the distance between the slider 10 and disk 12 substantially constant. The air bearing surface of slider 10 is designed to provide a constant fly height (for a given rotational disk speed) of slider 10 above the surface of disk 12. The head temperature is elevated using Joule heating of the exemplary MR element or stripe 16. As the head passes over the disk it is cooled in part by conduction. If a particle causes the gap spacing to temporarily vary, the temperature will cool and can be sensed as a momentary spike in the head readout signal due to its non-zero temperature coefficient of resistance. The amplitude of the spike is proportional to the temperature differential maintained in the MR head versus the disk surface and to the thermal properties of the asperity, and depends roughly as 1/d where d is the head-disk spacing (as opposed to the roughly average fly height).

Even in standard operation, the MR stripe 16 can be expected to run quite hot, since typical bias currents are in the range of 10–20 mA, with head resistances of a few tens of ohms. Thus, in a head/slider weighing no more than a gram, tens of milliwatts in Joule heating occurs. The temperature rise can be expected to be significant, and in fact proportional to the square of the current. The temperature rise will be determined by this heat flow, balanced by convective and/or conductive losses into the atmosphere and the disk. Further heating can be supplied with a resistor, and in fact may be desirable in order to bias the magnetic sensitivity to near zero. Typically, MR elements have a thermal sensitivity of resistance of $3\times10^{-3}/°K$. By avoiding substantial bias at the frequency used to measure the resistance of the element, magnetic contributions can be nearly eliminated.

Particle size can be estimated from the strength of the thermal signal. The effectiveness of cooling depends on both the width and height of the protrusion (or recess), and during the scan past the disturbance a fixed amount of heat energy will flow to the disk surface.

Use of existing MR head technology has several advantages. First, no additional development need be done, and implementation in a test stand can be achieved with little extra cost. Second, a large knowledge base exists about MR head properties, so that complete understanding of thermal response versus magnetic properties can be had at small added effort. Third, no modification of the head is required, so that significant costs in replacement heads is avoided (as exists with the PZT glide tester described in U.S. Pat. No. 4,532,802). Fourth, topographic screens and magnetic evaluation can be performed simultaneously, which is important as a time saver, and for providing new information correlating the two properties. Fifth, this technique can provide higher resolution and less ambiguous information about disturbances than piezo-based methods or magnetic methods alone.

Finally, the technique can be used to evaluate disks in assembled head-disk assemblies of disk drives.

The above-referenced U.S. patent application Ser. No. 08/056,164, now U.S. Pat. No. 5,527,110 to Abraham et al., is directed to the concept of Thermal Proximity Imaging ("TPI"), which consists of a method for mapping the character and location of small surface variations on a planar surface. In practice, TPI employs a heated resistive sensor moving in close proximity to the surface under inspection. The temperature of the head, and therefore the resistance of the sensor, are dependent on the spacing between the sensor and the inspected surface. The energy supply required to heat the sensor above ambient temperature may be thermal energy or optical energy but preferably is electrical energy which heats a resistive element. Preferably, the element is the magnetoresistive head of a disk drive assembly. The change in temperature is detected by monitoring the resistance of the magnetoresistive sensor of the head. The energy may be supplied in pulses to obtain higher peak temperatures while avoiding mechanical distortion of the object. It is preferred that the object be positioned with respect to the surface so that when that relative motion between the surface and the object occurs, the object does not contact the surface. As discussed further below, the present invention provides a method and apparatus to perform a detailed interpretation of the thermal environment or signature received from such a system.

Figure 2:
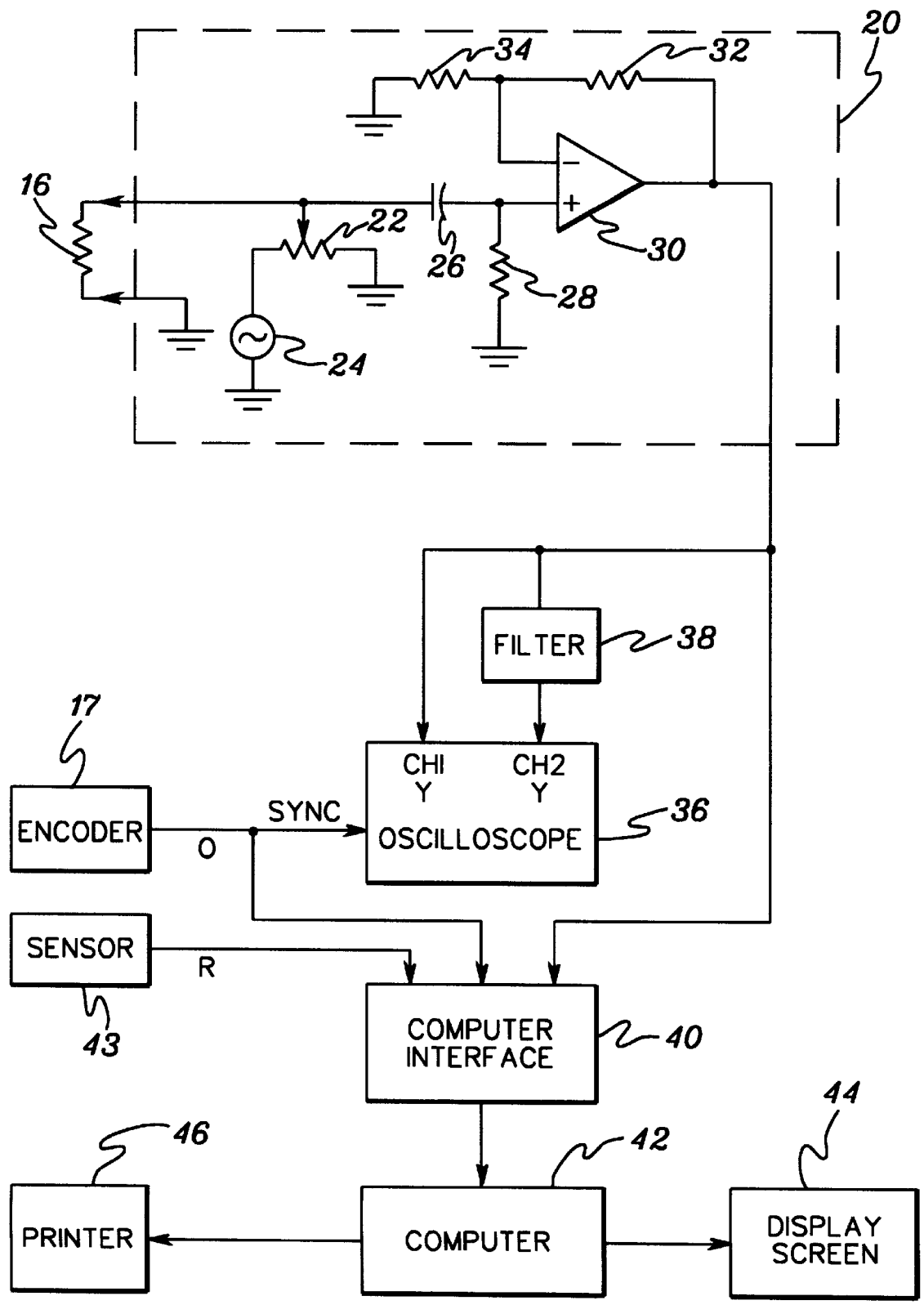
FIG. 2 is a diagram, partially schematic and partially in block, of a thermal proximity imaging apparatus.

Referring to FIG. 2, an exemplary TPI system for obtaining and evaluating data from slider 10 is illustrated. A pre-amplifier circuit 20 provides a bias current to the magnetic stripe 16 of slider 10 (FIG. 1). A potentiometer 22 connected to a voltage source 24 at one end and ground at the other end permits adjustments of the bias current. The slider of the potentiometer is connected to one side of magnetic stripe 16 (or, alternatively, to an inductive coil) of slider 10. The other side of stripe 16 is connected to ground, as is the side of voltage source 24 not connected to potentiometer 22.

Voltage source 24 may supply direct current, alternating current, or pulses having one polarity or alternating polarities. For the highest sensitivity, and therefore the best resolution of height of a protrusion, pulses are preferred. Pulsed operation permits the highest peak temperatures without overheating the slider 10 so as to cause mechanical distortion thereof.

Capacitor 26 and resistor 28 form a high pass filter which passes signals from the slider 10 to the non-inverting input of an operational amplifier 30.

Resistor 32 connected from the output of the operational amplifier to the inverting input and resistor 34 connected from the inverting input to ground determine the gain of operational amplifier 30, in a manner well known in the art. Typically, resistors 32 and 34 are selected so that operational amplifier 30 has a gain of 500.

Output signals from amplifier 30 are provided as Y axis inputs to a first channel of an oscilloscope 36. The same signals are sent to a low pass filter 38 and then to a Y axis input of a second channel of oscilloscope 36. The signals from a protrusion on the disk are generally in the form of a sharp spike having a 3 dB width corresponding to a time of less than 50 microseconds, or typically less than 250 microns of disk travel. These spikes are displayed on the first channel of oscilloscope 36. The magnetic data, which typically does not change amplitude as rapidly, passes through filter 38 and may be viewed on the second channel of the oscilloscope 36.

The signals from amplifier 30 are also supplied to a computer interface 40 which includes an analog-to-digital converter, of a type well known in the art, which converts the analog signals from operational amplifier 30 to digital form, for acquisition by a computer 42.

Information concerning the rotational position of the slider 10 with respect to the disk, provided by shaft encoder 17, which may be a pulse for every revolution of disk 12 is used as a synchronization input to oscilloscope 36. It is also used as a so-called θ position input. It is therefore supplied to computer interface 40 for eventual use by computer 42.

The position of slider 10 in the radial direction with respect to disk 12 is determined by a head position sensor 43 associated with the actuator 11 for slider 10. This radial position information is also supplied to computer interface 40.

The information supplied to computer interface 40 provides three dimensional data where the θ and radial position data define the position of a disturbance on the disk 12, while the information derived from the output of amplifier 30 provides an indication concerning the severity of the disturbance, with respect to height. The information is stored in a data base in computer 42, processed by suitable processing techniques and finally displayed on a display screen 44. Alternatively, a hard copy print out is provided by a printer 46.

Figure 3A:
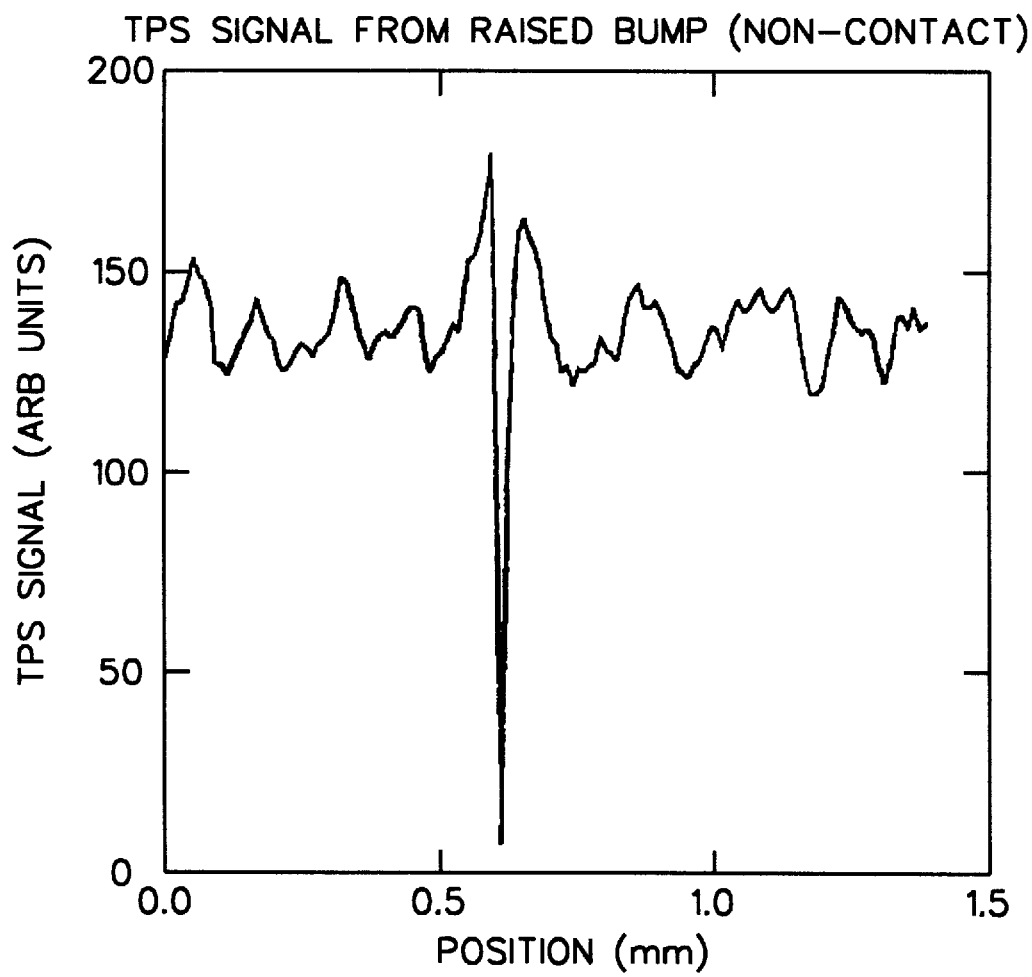
FIG. 3a is a plot of the amplitude of the signal from a protrusion-type surface disturbance versus spatial position.
Figure 3B:
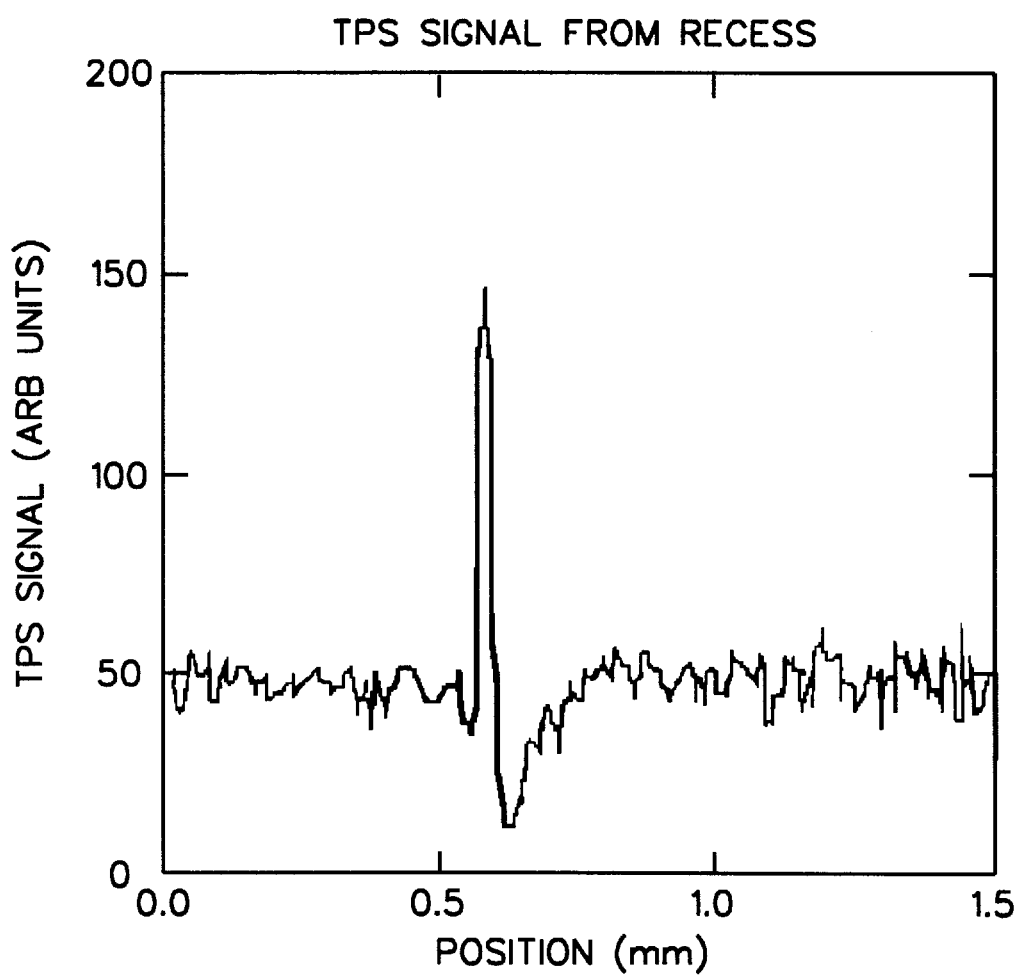
FIG. 3b is a plot of the amplitude of the signal from a recess-type surface disturbance versus spatial position.
Figure 3C:
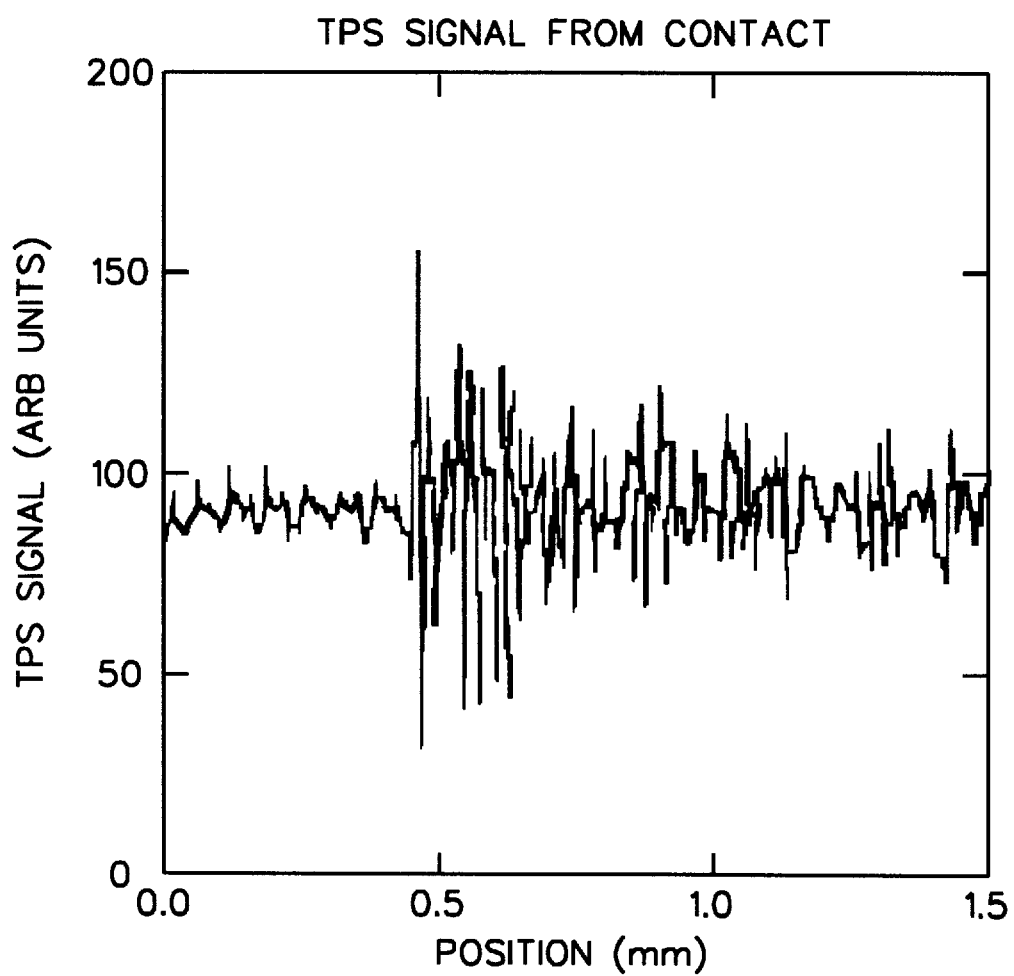
FIG. 3c is a plot of the amplitude of the signal resulting from contact between the sensor head and the medium.

FIGS. 3a, 3b and 3c respectively are plots of the thermal voltage produced across the magnetoresistive head as it passes across a disturbance corresponding to a protrusion above the disk surface, to a disturbance corresponding to a recess below the disk surface, and finally to an interaction or contact of the head and the disk, possibly caused by a protrusion of sufficient height. It can be seen, as the present inventors have discovered, that there is a qualitative difference between what are referred to herein as these three medium conditions, i.e., protrusions, recesses, and contact.

In FIG. 3a, a close approach of the disk surface due to the presence of a protrusion smaller than the head-disk gap clearance causes the temperature of MR head to adjust slightly downward during the time of passage of the defect past the sensor. This causes a reduction in the MR resistance due to the positive thermal coefficient of resistivity and a concomitant negative voltage spike.

In FIG. 3b, a recess caused in this case by a delamination of the magnetic layer probably due to contamination at the plating phase of manufacture is imaged by thermal means. The voltage trace in this case rises, since as the recess passes under the magnetoresistive element the head-disk gap clearance increases and the temperature rises. Since a temperature rise is associated with a MR element resistance rise, the voltage for constant bias shows a positive spike.

Finally, in FIG. 3c, the head has passed over a protrusion rising above the average disk surface, with sufficient height so as to cause the slider to substantially impact (i.e., an interaction) with the protrusion and in fact cause a deflection and subsequent vibration until the flight of the slider returns to a stable configuration. As before, the thermal signal reflects the gap clearance variation, and a significant signal is observed in both positive and negative voltages as the head fly height oscillates about its mean value.

By noting the different reaction of the thermal voltage to these three kinds of medium conditions, and in accordance with the principles of the present invention, it is possible to automatically categorize medium conditions according to type.

Figure 4:
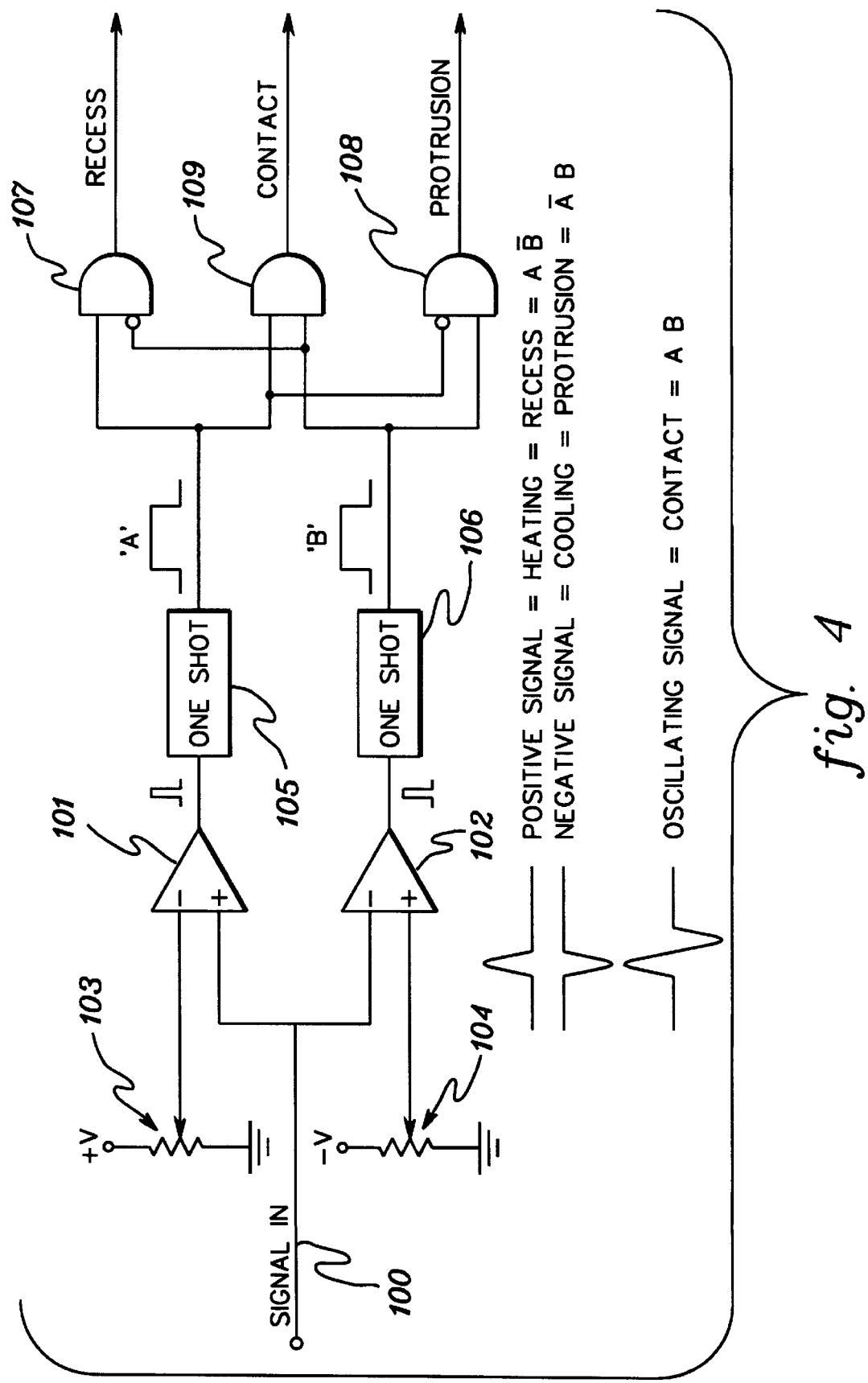
FIG. 4 is a schematic diagram of an exemplary apparatus according to the present invention, which provides the discrimination of three types of medium conditions in an automated fashion.

FIG. 4 shows a schematic diagram of an exemplary apparatus for carrying out this classification according to the principles of the present invention. The signal input node 100 (representative of the thermal environment monitored by the head over the medium) is driven by the preamplifier 20 (FIG. 2), and the input signal is fed to the positive input of a comparator 101 (the beginning of a first processing path), and to the negative input of another comparator 102 (the beginning of a second processing path). The negative input of comparator 101 is set by a voltage (e.g., first reference level) determined by a variable resistor 103 which is biased between positive voltage supply and ground.

Correspondingly, the positive input of comparator 102 is set by a voltage (e.g., second reference level) determined by variable resistor 104, which is biased between negative supply voltage and ground.

Comparator 101 therefore functions in a non-inverting mode and provides a constant positive voltage at its output during the time the input signal 100 exceeds the positive voltage set by variable resistor 103. Comparator 102 therefore functions in an inverting mode and provides a constant negative voltage (e.g., an active second signal) at its output during the time the input signal is more negative than the negative voltage set by variable resistor 104.

Attached to the output of the comparators 101 and 102 are one-shot triggered gates or pulse generators 105 and 106, respectively. If the gates are triggered, a pulse appears at the outputs. Each gate 105 and 106 has an associated predetermined time constant, such that if a short pulse triggers the gate, the output pulse rises and holds for a preconditioned period of time equal to the time constant. In practice, the time constant is adjusted to be several periods of the airbearing oscillation frequency, or roughly 0.1 ms.

The outputs of one-shots 105 and 106 are combined in three logical paths. First, AND gate 107 combines the output from gate 105 and the logical negative of gate 106, resulting in an output marked RECESS. Next, AND gate 108 combines the output of gate 106 and the logical negative of gate 105, resulting in an output marked PROTRUSION. Finally, the outputs from gates 105 and 106 are combined at AND gate 109, resulting in an output marked CONTACT.

According to the convention established in FIG. 4 wherein the pulses output from the pulse generators or one-shots 105 and 106 are labeled 'A' and 'B' respectively, the first output signal RECESS provided by AND gate 107 is active when only the A pulse is active (indicating a high input signal 100), and the B pulse (applied to the inverted input) is inactive. Similarly, the second output signal PROTRUSION provided by AND gate 108 is active when only the B pulse is active (indicating a low input signal 100), and the A pulse (applied to the inverted input) is inactive. Finally, the third output signal CONTACT provided by AND gate 109 is active when both the A and B pulses coincide in time (indicating an oscillation of input signal 100 between positive and negative levels during the predetermined pulse width window established within gates 105 and 106). These three criteria (high input signal level, low input signal level, and oscillating input signal) are therefore automatically sensed by the circuit of FIG. 4, and the existence of these conditions is provided to a follow-on user via the three output signals RECESS, PROTRUSION and CONTACT.

The function of the circuit can be understood as follows.

When a non-contact protrusion type disturbance is passed under the head, a negative voltage spike is produced. By comparing the voltage spike amplitude to a reference level set by the potentiometer 104, the comparator 102 will change state only if the protrusion exceeds a predetermined height, as determined by suitable calibration of the thermal voltage as a function of defect height. The comparator spike is of roughly the same duration as the original thermal signal, but is constrained to a fixed voltage value during the spike. This short spike is fed to a one-shot trigger 106 in order to broaden the spike signal in time. This accomplishes two goals. First, detection of the event by computer means is easier since the sampling rate can be substantially reduced. Second, coincidence measurements of positive and negative voltage spikes are made within a window, rather than precisely at the same moment. Thus, an oscillating thermal signal will trigger AND gate 109 if the predetermined time constants of gates 105 and 106 are sufficiently long.

The PROTRUSION output of gate 108 will function such that only when a negative spike and no positive spike within the time windows defined by the one-shots 105 and 106 will a signal be observed. Similarly, the RECESS output of gate 107 will function such that only when a positive spike and no negative spike within the time windows defined by the one-shots 105 and 106 will a signal be observed.

Further discrimination as to the type of condition can be obtained according to the principles of the present invention by combining thermally derived signals from the sensor with the signals obtained from the readback of magnetically recorded transitions on the disk surface. The interpretation of magnetic signals to determine surface topography is discussed in U.S. Pat. Nos. 5,130,866 and 4,777,544, both assigned to the assignee of the present invention, and both incorporated herein by reference in their entirety. The techniques may include CMD (Clearance Modulation Detection), HRF (Harmonic Ratio Flyheight) and QRS (Quantitative Readback Signal), known to those skilled in the art. However, by combining the thermal and magnetic data according to the present invention, a more accurate description of topography and specific surface defects can be provided.

As an example, consider the first case of a magnetic defect in the surface, but no topographic surface disturbances. This happens in several ways: a sub-surface void in the magnetic recording film, a localized region of altered magnetic coercivity, a buried non-magnetic particle, etc. In these cases, usually a potentially strong reduction in the amplitude of the magnetic signal occurs. This strong change in signal therefore may or may not correspond to a disturbance in the topography of the surface. It is important to know whether this is the case, since a simple magnetic defect can be avoided by simply not writing to this region, but a topographical error could crash the head.

An improved method of analyzing the defect is to obtain thermal data simultaneously with the acquisition of magnetic data. In the case of a magnetic defect only, essentially no deviation in the thermal signal would be observed. The classification of this condition as "magnetic defect non-topographic disturbance" is an important distinction for hard disk defect screening and can now be made pursuant to the principles of the present invention.

A second case may include a non-magnetic particle on top of the surface, which is small enough to not cause contact of the head. This particle would not result in a change of the magnetic signal, while the thermal signal would show a change in clearance height as discussed in detail above.

A third case may include the same type of particle which now causes contact with the head. In this case, the returns from both the magnetic and thermal sensors exhibit oscillation as discussed above in connection with FIG. 3c.

The fourth and fifth cases generally correspond to the surface disturbances of recesses and protrusions, assuming a magnetic coat has been placed conformally thereover. In these cases, both the magnetic and thermal sensors exhibit corresponding increases or decreases.

Table 1 distinguishes these five conditions sensed with the combination of magnetic and thermal sensors:

TABLE 1

| Condition | | Magnetic Sensor | Thermal Sensor |
|---|---|---|---|
| 1. | Mag. defect, no topographic disturbance | Usually appears as signal drop | No change in clearance |
| 2. | Non-mag. particle, no contact | No change | Clearance decrease |
| 3. | Non-mag. particle with contact | Clearance oscillation | Clearance oscillation |
| 4. | Recess with mag. coat | Clearance increase | Clearance increase |
| 5. | Protrusion with mag. coat | Clearance decrease | Clearance decrease |

Although this breakdown of conditions as determined by the interpretation of the magnetic and thermal signals is one potential scheme for classification, it should be recognized that a more complete treatment of all of the data, particularly using the calibrated magnetic and thermal signals, would result in a more detailed description of the particle properties, both topographic and magnetic.

Figure 5:
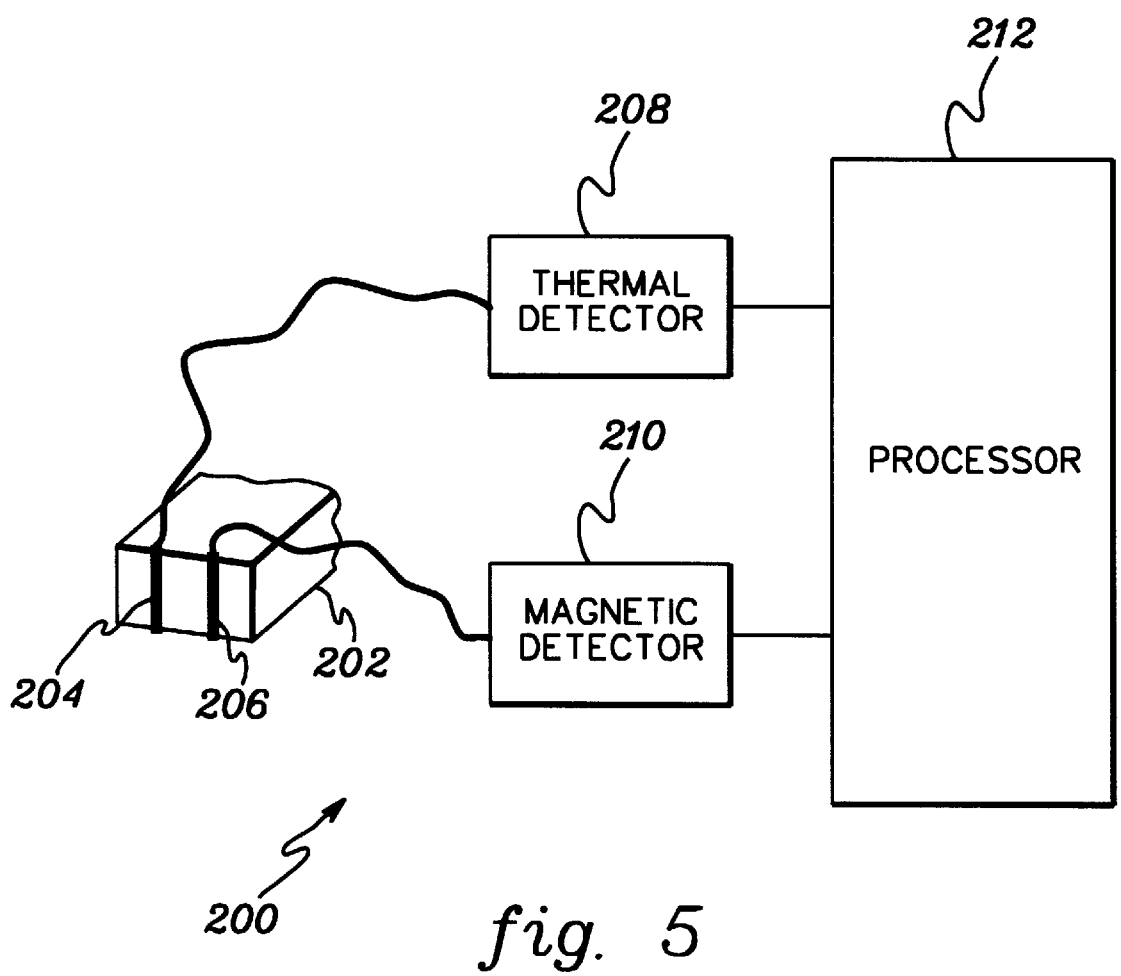
FIG. 5 is a schematic diagram of an exemplary apparatus according to the present invention, which provides both thermal and magnetic sensing of surface conditions.

FIG. 5 depicts an exemplary system 200 which combines a thermal sensing and processing path (204, 208) and a magnetic sensing and processing path (206, 210). The sensors (204, 206) are placed on a head 202, and a processor 212 is provided to combine and analyze the outputs from both paths, in accordance with at least the 5 cases discussed above. Sensors 204 and 206 could comprise the same sensor (e.g., MR) as discussed in detail above with regard to FIGS. 1 and 2. The detectors 208 and 210 could be implemented according to the general principles discussed above regarding FIG. 4, and/or the incorporated '866 or '544 patents.

While the description of the invention set forth above has centered primarily on the mapping and characterization of defects, one type of disturbance, it is noted that the invention may also be applied to a method and apparatus for the storage of information using intentionally placed disturbances. In particular, information can be encoded into the surface of a disk in the form of protrusions, recesses, or neither. Using the thermal imaging method and apparatus described herein, the information can be read back and retrieved for use in, for example, a data processing and/or storage system. Further, in view of the ability to discriminate between magnetic signals and signals resulting from the topography of the disk, it is possible to encode some information on the disk using magnetic techniques and other information using topographical techniques. Different kinds of information can be encoded in this manner, for example, it may be preferable to encode information to be permanently stored by topographical techniques while information which is to be changed can be encoded by magnetic techniques.

While the invention has been particularly shown and described with respect to a preferred embodiment thereof, it will be understood by those skilled in the art that changes in form and details may be made therein without departing from the scope and spirit of the invention.

What is claimed is:

1. A system for identifying surface conditions of a medium moving relative to a head, comprising:

an input node for receiving an input signal, the input signal being primarily representative of a thermal environment over the medium monitored by said head;

a first processing path coupled to the input node for determining whether the input signal received therefrom meets a first criteria, the first criteria corresponding to a first type of surface disturbance on the medium, wherein the first processing path provides an active first signal indicative of the input signal rising above/falling below a first reference level comprising said first criteria, the first processing path including:

a first comparator coupled to the input node for receiving the input signal therefrom, the first comparator for comprising the input signal to the first reference level, and a first pulse generator, triggered by the first comparator, for providing the active first signal; and a second processing path coupled to the input node for determining whether the input signal received therefrom meets a second criteria, the second criteria corresponding to a second type of surface disturbance on the medium, wherein the second processing path provides an active second signal indicative of the input signal falling below/rising above a second reference level comprising said second criteria, the second processing path including:

a second comparator coupled to the input node for receiving the input signal therefrom, the second comparator for comparing the input signal to the second reference level, and a second pulse generator, triggered by the second comparator, for providing the active second signal.

2. The system of claim 1, further comprising:

a sensor for monitoring said thermal environment; and a circuit, in cooperation with said sensor, to provide the input signal to the input node.

3. The system of claim 1, wherein a magnetoresistive element is used to monitor the thermal environment.

4. The system of claim 3, wherein the magnetoresistive element is also used to magnetically read data from said medium.

5. The system of claim 1, further comprising:

another input node for receiving another input signal, the another input signal being representative of a magnetic environment on the moving medium; and a magnetic environment processing path for processing the another magnetic input signal and detecting magnetic defects therefrom.

6. The system of claim 5, wherein the first type of surface disturbance is a protrusion, and wherein the first processing path and the magnetic environment processing path cooperatively determine whether the protrusion is intrinsic to the medium or a particle on the medium.

7. The system of claim 1 in combination with a head and a medium moving relative to said head.

8. The combination of claim 7 wherein said medium is a data storage medium accessed by said head.

9. The system of claim 1, wherein the active first signal comprises a first pulse from the first pulse generator, the first pulse having a predetermined width.

10. The system of claim 9, wherein the active second signal comprises a second pulse from the second pulse generator in the second path, the second pulse having a predetermined width.

11. The system of claim 10, wherein the first processing path includes a first gate having first and second inputs for receiving the first and second pulses respectively, the first gate providing a first output when only the first pulse is active.

12. The system of claim 11, wherein the second processing path includes a second gate having first and second inputs for receiving the first and second pulses respectively, the second gate providing a second output when only the second pulse is active.

13. The system of claim 12, wherein the first criteria comprises the input signal rising above the first reference level and the first type of surface disturbance is a recess.

14. The system of claim 13, wherein the second criteria comprises the input signal falling below the second level and the second type of surface disturbance is a protrusion.

15. The system of claim 10, further comprising a circuit for determining whether the input signal meets a third criteria, the circuit having first and second inputs for receiving the first and second pulses respectively, the circuit providing a third output if coincident first and second pulses are received thereby, the third criteria corresponding to an interaction between the head and the medium.

16. A system for identifying surface conditions of a medium moving relative to a head, comprising:
- an input node for receiving an input signal, the input signal being representative of a thermal environment over the medium monitored by said head;
- a first processing path coupled to the input node for determining whether the input signal received therefrom meets a first criteria, the first criteria corresponding to a first type of surface disturbance on the medium:
- a second processing path coupled to the input node for determining whether the input signal received therefrom meets a second criteria, the second criteria corresponding to a second type of surface disturbance on the medium; and
- a circuit for determining whether the input signal meets a third criteria, the third criteria corresponding to an interaction between the head and the medium.

17. The system of claim 16,
wherein the first processing path provides an active first signal indicative of the input signal rising above/falling below a first reference level comprising said first criteria; and
wherein the second processing path provides an active second signal indicative of the input signal falling below/rising above a second reference level comprising said second criteria.

18. The system of claim 17, wherein the first path includes:
- a comparator coupled to the input node for receiving the input signal therefrom, the comparator for comparing the input signal to the first reference level; and
- a first pulse generator, triggered by the comparator, for providing the active first signal.

19. The system of claim 18, wherein the active first signal comprises a first pulse from the pulse generator, the first pulse having a predetermined width.

20. The system of claim 19, wherein the active second signal comprises a second pulse from a second pulse generator in the second path, the second pulse having a predetermined width.

21. The system of claim 20, wherein the circuit for determining whether the input signal meets a third criteria has first and second inputs for receiving the first and second pulses respectively, the circuit providing a third output signal if coincident first and second pulses are received thereby.

22. The system of claim 21, wherein the first processing path includes a first gate having first and second inputs for receiving the first and second pulses respectively, the first gate providing a first output when only the first pulse is active.

23. The system of claim 22, wherein the first gate comprises an AND gate, the first input thereof coupled to the output of the first pulse generator and the second input thereof comprising an inverted input coupled to the output of the second pulse generator.

24. The system of claim 23, wherein the second processing path includes a second gate having first and second inputs for receiving the first and second pulses respectively, the second gate providing a second output when only the second pulse is active.

25. The system of claim 24, wherein the second gate comprises an AND gate, the first input thereof coupled to the output of the second pulse generator and the second input thereof comprising an inverted input coupled to the output of the first pulse generator.

26. The system of claim 25, wherein the first criteria comprises the input signal rising above the first reference level and the first type of surface disturbance is a recess.

27. The system of claim 26, wherein the second criteria comprises the input signal falling below the second level and the second type of surface disturbance is a protrusion.

28. The system of claim 27, wherein the third criteria comprises an oscillating input signal level.

29. The system of claim 17,
wherein the first processing path provides a first output signal when the first signal is active; and
wherein the second processing path provides a second output signal when the second signal is active.

30. The system of claim 16, wherein the first criteria comprises a high/low input signal level and the second criteria comprises a low/high input signal level, and the third criteria comprises an oscillating signal level.

31. The system of claim 30, wherein the oscillating signal level oscillates between two input signal levels within a predetermined time period.

32. The system of claim 16, further comprising:
- another input node for receiving another input signal, the another input signal being representative of a magnetic environment on the moving medium; and
- a magnetic environment processing path for determining whether the another input signal meets the first, second or third criteria.

33. A system for identifying surface conditions of a medium moving relative to a head, comprising:
- an input node for receiving an input signal, the input signal being representative of a thermal environment over the medium monitored by said head;
- a first processing path coupled to the input node for determining whether the input signal received therefrom meets a first criteria, the first criteria corresponding to a first type of surface disturbance on the medium; and
- a circuit for determining whether the input signal received therefrom meets a second criteria, the second criteria corresponding to an interaction between the head and the medium.

34. The system of claim 33, further comprising:

a second processing path for determining whether the input signal meets a third criteria, the third criteria corresponding to a second type of surface disturbance on the medium.

35. The system of claim 34, wherein the first criteria comprises a high/low input signal level and the second criteria comprises an oscillating signal level and the third criteria comprises a low/high input signal level.

36. The system of claim 35, wherein the oscillating signal level oscillates between two input signal levels within a predetermined time period.

* * * * *

UNITED STATES PATENT AND TRADEMARK OFFICE
CERTIFICATE OF CORRECTION

PATENT NO. : 5,810,477
DATED : September 22, 1998
INVENTOR(S) : Abraham et al.

It is certified that error appears in the above-identified patent and that said Letters Patent is hereby corrected as shown below:

Column 10, Line 14,    "comprising" should read --comparing--

Signed and Sealed this

Eighth Day of June, 1999

Attest:

Q. TODD DICKINSON

*Attesting Officer*    Acting Commissioner of Patents and Trademarks